United States Patent
Cheng et al.

(10) Patent No.: US 10,390,244 B2
(45) Date of Patent: Aug. 20, 2019

(54) METHOD OF MEASURING RADIO LINK QUALITY IN A D2D USER EQUIPMENT

(71) Applicant: Alcatel Lucent, Nozay (FR)

(72) Inventors: Fang-Chen Cheng, Randolph, NJ (US); Dong Li, Shanghai (CN); Yong Liu, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/576,422

(22) PCT Filed: May 13, 2016

(86) PCT No.: PCT/IB2016/000848
§ 371 (c)(1),
(2) Date: Nov. 22, 2017

(87) PCT Pub. No.: WO2016/189392
PCT Pub. Date: Dec. 1, 2016

(65) Prior Publication Data
US 2018/0160325 A1   Jun. 7, 2018

(30) Foreign Application Priority Data
May 25, 2015   (CN) .......................... 2015 1 0272055

(51) Int. Cl.
H04W 24/00   (2009.01)
H04W 24/08   (2009.01)
(Continued)

(52) U.S. Cl.
CPC .......... H04W 24/08 (2013.01); H04B 17/318 (2015.01); H04B 17/336 (2015.01);
(Continued)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS

2005/0054366 A1* 3/2005 Chen ................... H04W 52/362
455/522
2006/0064625 A1* 3/2006 Klein .................... H04L 1/1671
714/776
(Continued)

FOREIGN PATENT DOCUMENTS

EP   2 833 694 A2   2/2015

OTHER PUBLICATIONS

ITRI, "Consideration Relay selection and discovery for UE-to-Network Relay," 3rd Generation Partnership Project (3GPP), 3GPP TSG RAN WG1 Meeting #80bis, R1-152946, pp. 1-4, XP050970651, Fukuoka, Japan, May 25-29, 2015.
(Continued)

*Primary Examiner* — Hassan A Phillips
*Assistant Examiner* — Prenell P Jones
(74) *Attorney, Agent, or Firm* — Fay Sharpe LLP

(57) ABSTRACT

A method of measuring radio link quality in a D2D user equipment in a wireless communication system including an eNB and at least two D2D user equipments, UEs: a first D2D UE receives a discovery packet from a second D2D UE; and the first D2D UE measures the radio link quality based on the reception of the discovery packet and generates a wireless link quality indication, which indicates sidelink quality between the first D2D UE and the second D2D UE; wherein the at least two D2D user equipments include an alternative UE-to-network relay D2D UE and a remote D2D UE; and the first D2D UE is the remote D2D UE, and the second D2D UE is the alternative UE-to-network relay D2D UE; or
(Continued)

the first D2D UE is the alternative UE-to-network relay D2D UE, and the second D2D UE is the remote D2D UE.

14 Claims, 2 Drawing Sheets

(51) Int. Cl.
  *H04W 76/23*  (2018.01)
  *H04W 76/14*  (2018.01)
  *H04B 17/318*  (2015.01)
  *H04B 17/336*  (2015.01)
  *H04W 8/00*  (2009.01)
  *H04W 36/30*  (2009.01)
  *H04W 88/04*  (2009.01)
  *H04W 36/00*  (2009.01)
  *H04L 29/08*  (2006.01)
  *H04W 92/18*  (2009.01)

(52) U.S. Cl.
  CPC .......... *H04W 76/14* (2018.02); *H04W 76/23* (2018.02); *H04L 69/324* (2013.01); *H04W 8/005* (2013.01); *H04W 36/0083* (2013.01); *H04W 36/30* (2013.01); *H04W 88/04* (2013.01); *H04W 92/18* (2013.01)

(56) References Cited

U.S. PATENT DOCUMENTS

| | | | | |
|---|---|---|---|---|
| 2014/0153390 A1* | 6/2014 | Ishii | .................. | H04W 28/0289 370/230 |
| 2015/0264551 A1* | 9/2015 | Ko | ........................ | H04W 76/14 370/329 |
| 2015/0334755 A1* | 11/2015 | Ayadurai | .............. | H04W 76/14 370/252 |
| 2016/0080969 A1* | 3/2016 | Tseng | ..................... | H04W 4/70 370/329 |

OTHER PUBLICATIONS

Ericsson, "Measurements, Signaling, and Selection Rules for Relay Discovery," 3rd Generation Partnership Project (3GPP), 3GPP TSG RAN WG1 Meeting #80bis, R1-151767, 7 pages, XP050934628, Belgrade, Serbia, Apr. 20-24, 2015.

Ericsson, "Signalling required for UE-NW relay selection," 3rd Generation Partnership Project (3GPP), 3GPP TSG RAN WG2 #90, R2-152462, pp. 1-17, Fukuoka, Japan, May 25-29, 2015.

ZTE, "Relay selection and reselection," 3rd Generation Partnership Project (3GPP), 3GPP TSG RAN WG2 #90, R2-152547, 4 pages, XP050973137, Fukuoka, Japan, May 25-29, 2015.

Ericsson, "D2D Link Measurements Definitions," 3rd Generation Partnership Project (3GPP), 3GPP TSG RAN WG1 Meeting #81, R1-153350, 3 pages, XP050971325, Fukuoka, Japan, May 25-29, 2015.

LG Electronics, "Synchronization enhancements for UE-to-network relay operation," 3rd Generation Partnership Project (3GPP), 3GPP TSG RAN WG1 Meeting #81, R1-152722, 3 pages, XP050973784, Fukuoka, Japan, May 25-29, 2015.

Huawei et al., "UE-to-Network relay association procedure," 3rd Generation Partnership Project (3GPP), 3GPP TSG RAN WG1 Meeting #81, R1-152466, 2 pages, XP050970925, Fukuoka, Japan, May 25-29, 2015.

Fujitsu, "Discussion of D2D Relay," 3rd Generation Partnership Project (3GPP), 3GPP TSG RAN WG1 Meeting #81, R1-153061, 3 pages, XP050972300, Fukuoka, Japan, May 25-29, 2015.

LG Electronics, "Discovery and measurement enhancements for UE-to-network relay operation," 3rd Generation Partnership Project (3GPP), 3GPP TSG RAN WG1 Meeting #81, R1-152723, 3 pages, XP050973872, Fukuoka, Japan, May 25-29, 2015.

NTT Docomo, "Views on UE-to-Network Relay Discovery," 3rd Generation Partnership Project (3GPP), 3GPP TSG RAN WG1 Meeting #80bis, R1-151965, pp. 1-6, XP050934818, Belgrade, Serbia, Apr. 20-24, 2015.

Huawei et al., "Procedure of Relay-UE selection and reselection," 3rd Generation Partnership Project (3GPP), 3GPP TSG RAN WG2 Meeting #90, R2-152467, pp. 1-4, XP050973688, Fukuoka, Japan, May 25-29, 2015.

3rd Generation Partnership Project; Technical Specification Group Services and System Aspects; Study on extended architecture support for proximity-based services (Release 13), 3GPP TR 23.713 V13.0.0, pp. 1-80, (Sep. 2015).

3rd Generation Partnership Project; Technical Specification Group Radio Access Network; Evolved Universal Terrestrial Radio Access (E-UTRA); Physical layer; Measurements (Release 12), 3GPP TS 36.214 V12.2.0, pp. 1-17, (Mar. 2015).

International Search Report for PCT/IB2016/000848 dated Sep. 16, 2016.

\* cited by examiner

| RLQ | N | N-1 | N-2 | ...... | N-k | ...... | 4 | 3 | 2 | 1 |
|---|---|---|---|---|---|---|---|---|---|---|
| Number of HARQ combining with CRC successful | 1 | 1 | 1 | ...... | 2 | ...... | 4 | 4 | 4 | 4 |
| SINR (dB) | 25 | 20 | 15 | ...... | 25 | ...... | -4 | -6 | -8 | -10 |

Fig.3

METHOD OF MEASURING RADIO LINK QUALITY IN A D2D USER EQUIPMENT

FIELD OF THE INVENTION

The present disclosure relates to wireless communication, and particularly to a method of measuring radio link quality in a D2D user equipment in a wireless communication system.

BACKGROUND OF THE INVENTION

In RAN1#80bis, Korean government adopts LTE and D2D features for Korean public safety. It was proposed that Rel-13 LTE D2D should be designed with no change to Rel-12 physical layer sidelink signals and channels for public safety. This does not preclude essential enhancements that reuse Rel-12 physical sidelink signals and channels if they have no impact to keep Rel-13 standardization timeline. The intention is to avoid hardware changes in the Rel-13 eD2D in supporting Network-to-UE (user equipment) relay and out-of-coverage/partial coverage discovery. The limitations of no hardware changes implies the constraint of eD2D system design in the following ways:

No change of Rel-12 physical layer channels structures;
No change of Rel-12 physical layer modulation and coding schemes;
No change of Rel-12 physical layer procedures for SA and data; and
No change of Rel-12 physical layer measurements.

In Rel-13 eD2D, Network-to-UE relay requires reference measurement in support of relay node selection. Rel-12 defines Sidelink Reference Signal Received Power (S-RSRP) as the reference measurement for the radio link quality of the synchronization source. S-RSRP is measured on the DMRS of PSBCH, which is only transmitted by D2D synchronization source. For Network-to-UE discovery, a new reference measurement of radio link quality (RLQ) needs to be defined without changing the hardware in the D2D device.

SUMMARY OF THE INVENTION

Based on the understanding of the above background, the present invention propose a method of measuring radio link quality in a D2D user equipment in a wireless communication system, wherein the wireless communication system includes an eNB and at least two D2D user equipments, the method comprising:

a first D2D user equipment receives a discovery packet from a second D2D user equipment; and
the first D2D user equipment measures the radio link quality based on the reception of the discovery packet and generates a wireless link quality indication, which indicates sidelink quality between the first D2D user equipment and the second D2D user equipment;

wherein the at least two D2D user equipments include an alternative user equipment-to-network relay D2D user equipment and a remote D2D user equipment; and the first D2D user equipment is the remote D2D user equipment, and the second D2D user equipment is the alternative user equipment-to-network relay D2D user equipment; or
the first D2D user equipment is the alternative user equipment-to-network relay D2D user equipment, and the second D2D user equipment is the remote D2D user equipment. Herein, the sidelink is the wireless link between the D2D UEs, and the remote D2D UE is a D2D UE which needs to be connected to the network via a Network-to-UE relay UE.

In this invention, it is innovatively proposed that a wireless link quality indication, which indicates sidelink quality between the first D2D UE and the second D2D UE, is generated according to the measurement for the discovery packet received by the first D2D UE. With this method, the radio link quality (RLQ) can be characterized, and not only the compatibility with Release 12 is realized, but also the measurement for the radio link quality between the first D2D UE and the second D2D UE is realized with a simple method.

In one embodiment of the present invention, the wireless link quality indication is related to at least one of the following:

CRC check of the discovery packet;
signal quality of the discovery packet; and/or
number of the discovery packets needed for the soft combined decoding when the CRC check is implemented correctly.

It is appreciated for those skilled in the art that, the abovementioned wireless link quality indication can be related to anyone of the above three factors, and can also be related to any two of the above three factors, and can be related to all of the three factors. Three possible manners for characterizing the wireless link quality are shown above. It is appreciated for those skilled in the art that other parameters obtained by the discovery packet can also be used as the wireless link quality indication, as long as they can characterize the wireless link quality.

In one embodiment of the present invention, when the wireless link quality indication is related to the CRC check of the discovery packet, the discovery packet includes payload bits and CRC check bits.

It is appreciated for those skilled in the art that the size of the payload can be 232 bits, and the size of the CRC check can be 24 bits. Of course, other combinations, little smaller the size of the payload and little bigger the size of the CRC check are also feasible.

In one embodiment of the present invention, when the wireless link quality indication is related to the signal quality of the discovery packet, the signal quality of the discovery packet includes strength of a received signal, SNR of a received signal or SINR of a received signal.

The above is merely exemplary and not limited, that is, the signal quality of the discovery packet is not limited to the strength of the received signal, SNR of the received signal or SINR of the received signal.

In one embodiment of the present invention, the better the signal quality of the discovery packet is, the better the sidelink quality between the first D2D user equipment and the second D2D user equipment represented by the wireless link quality indication is.

It is appreciated for those skilled in the art, that the better the signal quality of the discovery packet is, means that the disturbance subject in the transmission progress is lower and the quality of the used channel is good, that is, the better the sidelink quality between the first D2D user equipment and the second D2D user equipment represented by the wireless link quality indication is.

In one embodiment of the present invention, when the wireless link quality indication is related to the number of the discovery packets needed for the soft combined decoding when the CRC check is implemented correctly, the number of the discovery packets needed for the soft combined decoding in a discovery period can be configured as 4 at maximum.

Herein, it is appreciated for those skilled in the art, 4 is only exemplary not limited. The eNB can also set other numbers, 6, 8, for example.

In one embodiment of the present invention, the more the number of the discovery packets needed for the soft combined decoding when the CRC check is implemented correctly, the worse the sidelink quality between the first D2D user equipment and the second D2D user equipment represented by the wireless link quality indication is.

It is appreciated for those skilled in the art, that the more the number of the discovery packets needed for the soft combined decoding when the CRC check is implemented correctly, means that the number of the failures for the CRC check of previous discovery packets is higher. That is, the previous discovery packets fail due to higher disturbance or lower channel quality. That is, the sidelink quality between the first D2D user equipment and the second D2D user equipment represented by the wireless link quality indication is worse.

In one embodiment of the present invention, the wireless link quality indication, which is used to indicate the sidelink quality between the first D2D user equipment and the second D2D user equipment, is combined indicated by the signal quality and the number of the discovery packets needed for the soft combined decoding when the CRC check is implemented correctly.

In one embodiment of the present invention, the wireless link quality indication can be scaled linearly or non-linearly.

In one embodiment of the present invention, the method further comprises:

the first D2D user equipment requests the second D2D user equipment to send the discovery packet.

It is appreciated for those skilled in the art that the send of the discovery packet can be sent by the second D2D UE initiatively, or can be sent by the second D2D UE passively in response to the request from the first D2D UE.

In one embodiment of the present invention, the discovery packet includes at least one of the following information:
  message type, wherein the message type includes announcement type or solicitation/response type;
  discovery type, which indicates the discovery type is user equipment-to-network relay discovery, group member discovery or user equipment-to-user equipment relay discovery;
  ProSe relay user equipment ID;
  PLMN ID;
  connectivity information;
  status/maintenance flag; and/or
  group information.

The above contents contained in the discovery packet are only exemplary. Herein, the type listed above is not intended to exhaust all the possibilities, but only used to show the possible contents contained in the discovery packet, for example. That is, the discovery packet includes, but not limited to, the above contents.

In one embodiment of the present invention, when the first D2D user equipment is the remote D2D user equipment, and the second D2D user equipment is the alternative user equipment-to-network relay D2D user equipment, the method further comprises:
  the first D2D user equipment selects one second D2D user equipment as its relay user equipment according to the wireless link quality indication.

After obtaining the wireless link quality indication, when the first D2D user equipment is the remote D2D user equipment, and the second D2D user equipment is the alternative user equipment-to-network relay D2D user equipment, the remote D2D UE, which obtains the wireless link quality indication, will select one second D2D UE as its relay UE from the alternative UE-to-Network relay D2D UEs according to the wireless quality indication.

In one embodiment of the present invention, when the first D2D user equipment is the alternative user equipment-to-network relay D2D user equipment, and the second D2D user equipment is the remote D2D user equipment, the first D2D user equipment sends the wireless link quality indication to an eNB it communicates with.

In this invention, it is innovatively proposed that a wireless link quality indication, which indicates sidelink quality between the first D2D UE and the second D2D UE, is generated according to the measurement for the discovery packet received by the first D2D UE. With this method, the radio link quality (RLQ) can be characterized, and not only the compatibility with Release 12 is realized, but also the measurement for the radio link quality is realized with a simple method.

BRIEF DESCRIPTION OF DRAWINGS

Other features, objects and advantages of the invention will become more apparent upon review of the following detailed description of non-limiting embodiments taken with reference to the drawings in which:

FIG. 3 shows a detail exemplary table showing RLQ, the number of the discovery data packets needed for the soft combined decoding when CRC check is implemented correctly and SINR.

In the drawings, identical or like reference numerals denote identical or corresponding components or features throughout the different figures.

DETAILED DESCRIPTION OF EMBODIMENTS

The below described particular description of preferred embodiments will be given with reference to the drawings constituting a part of the invention. The drawings exemplarily illustrate particular embodiments, in which the invention can be practiced. The exemplary embodiments are not intended to exhaust all the embodiments of the invention. As can be appreciated, other embodiments can be possible or structural or logical modifications can be made without departing from the scope of the invention. Thus the following detailed description is not intended to be limiting, and the scope of the invention will be defined as in the appended claims.

Figure 1:
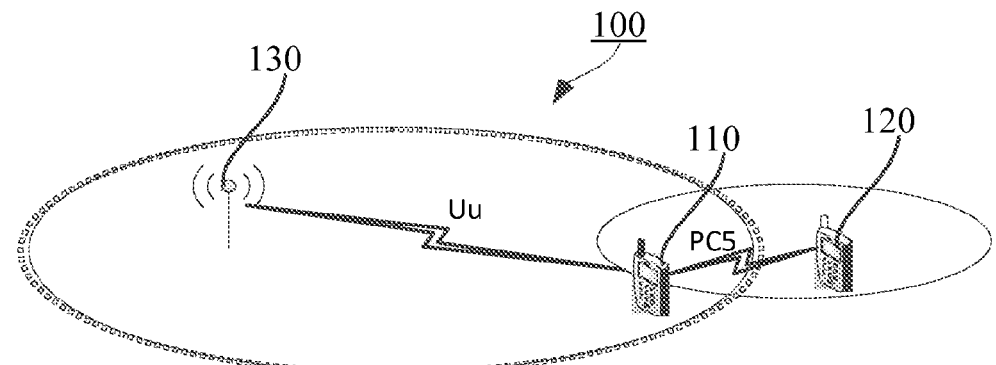
FIG. 1 shows a diagram 100 for the application scenario for the method according to the invention.

FIG. 1 shows a diagram 100 for the application scenario for the method according to the invention. As show in the Figure, the remote UE 120 is located outside the coverage of the eNB 130, and a UE-to-Network relay UE 110 is located within the coverage of the eNB 130. Herein, the communication between eNB 130 and the UE-to-Network relay UE 110 uses a UU interface for connection and communication, and the communication between the UE-to-Network relay UE 110 and the remote UE 120 uses a PC5 interface for connection and communication.

In order to characterize the PC5 interface, that is, the sidelink channel quality, the present invention proposes a method of measuring radio link quality in a D2D user equipment in a wireless communication system, wherein the wireless communication system includes an eNB and at least two D2D user equipments, as shown in FIG. 1.

Figure 2:
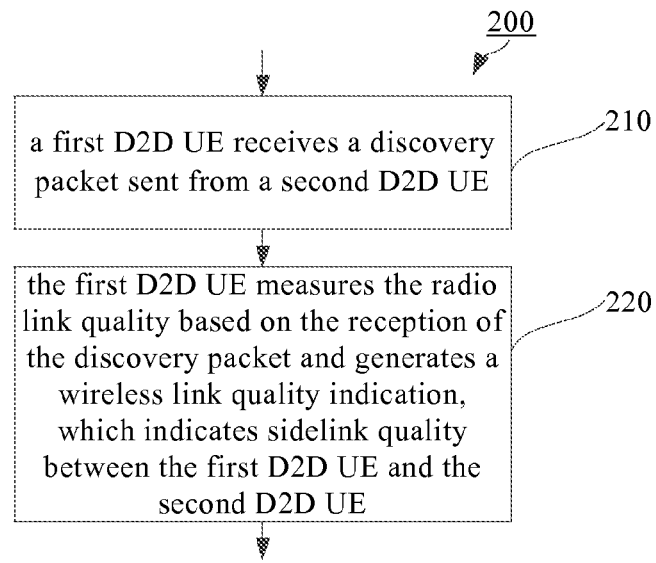
FIG. 2 shows a flowchart 200 for the method of measuring radio link quality in a D2D user equipment in a wireless communication system according to the invention.

FIG. 2 shows a flowchart 200 for the method of measuring radio link quality in a D2D user equipment in a wireless communication system according to the invention. As shown in FIG. 2, the method comprises:

Firstly, in method step 210, a first D2D user equipment receives a discovery packet from a second D2D user equipment.

Then, in method step 220, the first D2D user equipment measures the radio link quality based on the reception of the discovery packet and generates a wireless link quality indication, which indicates sidelink quality between the first D2D user equipment and the second D2D user equipment.

Herein, the at least two D2D user equipments include an alternative user equipment-to-network relay D2D user equipment and a remote D2D user equipment; and the first D2D user equipment is the remote D2D user equipment, and the second D2D user equipment is the alternative user equipment-to-network relay D2D user equipment; or the first D2D user equipment is the alternative user equipment-to-network relay D2D user equipment, and the second D2D user equipment is the remote D2D user equipment.

In this invention, it is innovatively proposed that a wireless link quality indication, which indicates sidelink quality between the first D2D UE and the second D2D UE, is generated according to the measurement for the discovery packet received by the first D2D UE. With this method, the radio link quality (RLQ) can be characterized, and not only the compatibility with Release 12 is realized, but also the measurement for the radio link quality is realized with a simple method.

In one embodiment of the present invention, the wireless link quality indication is related to at least one of the following:

CRC check of the discovery packet;
signal quality of the discovery packet; and/or
number of the discovery packets needed for the soft combined decoding when the CRC check is implemented correctly.

It is appreciated for those skilled in the art that, the abovementioned wireless link quality indication can be related to anyone of the above three factors, and can also be related to any two of the above three factors, and can be related to all of the three factors. Three possible manners for characterizing the wireless link quality are shown above. It is appreciated for those skilled in the art that other parameters obtained by the discovery packet can also be used as the wireless link quality indication, as long as they can characterize the wireless link quality.

In one embodiment of the present invention, when the wireless link quality indication is related to the CRC check of the discovery packet, the discovery packet includes payload bits and CRC check bits.

It is appreciated for those skilled in the art that the size of the payload can be 232 bits, and the size of the CRC check can be 24 bits. Of course, other combinations, little smaller the size of the payload and little bigger the size of the CRC check are also feasible.

In one embodiment of the present invention, when the wireless link quality indication is related to the signal quality of the discovery packet, the signal quality of the discovery packet includes strength of a received signal, SNR of a received signal or SINR of a received signal.

The above is merely exemplary and not limited, that is, the signal quality of the discovery packet is not limited to the strength of the received signal, SNR of the received signal or SINR of the received signal.

The signal process at the UE receiver measures the channel response from DMRS and estimates the received signal strength and received signal to noise ratio before demodulation and decoding.

In one embodiment of the present invention, the better the signal quality of the discovery packet is, the better the sidelink quality between the first D2D user equipment and the second D2D user equipment represented by the wireless link quality indication is.

It is appreciated for those skilled in the art, that the better the signal quality of the discovery packet is, means that the disturbance subject in the transmission progress is lower and the quality of the used channel is good, that is, the better the sidelink quality between the first D2D user equipment and the second D2D user equipment represented by the wireless link quality indication is.

In one embodiment of the present invention, when the wireless link quality indication is related to the number of the discovery packets needed for the soft combined decoding when the CRC check is implemented correctly, the number of the discovery packets needed for the soft combined decoding in a discovery period can be configured as 4 at maximum.

A D2D receiving UE can soft combine the received discovery packets with the previous received discovery packets if the CRC check of previous reception(s) fails. In one discovery period, after the receiver receives a first packet, the CRC check is successful, then stopping; if the CRC check fails, buffering the discovery packet, it will be soft combined decoded with all the previous discovery packets after one HARQ retransmission. If the CRC check fails again, the above operation will be conduct again; if the CRC check is successful, then stopping. The number of the discovery packets used by the soft combination reflects the link quality.

Herein, it is appreciated for those skilled in the art, 4 is only exemplary not limited. The eNB can also set other numbers, 6, 8, for example.

In one embodiment of the present invention, the more the number of the discovery packets needed for the soft combined decoding when the CRC check is implemented correctly, the worse the sidelink quality between the first D2D user equipment and the second D2D user equipment represented by the wireless link quality indication is.

It is appreciated for those skilled in the art, that the more the number of the discovery packets needed for the soft combined decoding when the CRC check is implemented correctly, means that the number of the failures for the CRC check of previous discovery packets is higher. That is, the previous discovery packets fail due to higher disturbance or lower channel quality. That is, the sidelink quality between the first D2D user equipment and the second D2D user equipment represented by the wireless link quality indication is worse.

In one embodiment of the present invention, the wireless link quality indication, which is used to indicate the sidelink quality between the first D2D user equipment and the second D2D user equipment, is combined indicated by the signal quality and the number of the discovery packets needed for the soft combined decoding when the CRC check is implemented correctly.

In one embodiment of the present invention, the wireless link quality indication can be scaled linearly or non-linearly.

In one embodiment of the present invention, the method further comprises:

the first D2D user equipment requests the second D2D user equipment to send the discovery packet.

It is appreciated for those skilled in the art that the send of the discovery packet can be sent by the second D2D UE initiatively, or can be sent by the second D2D UE passively in response to the request from the first D2D UE.

In one embodiment of the present invention, he discovery packet includes at least one of the following information:
   message type, wherein the message type includes announcement type or solicitation/response type;
   discovery type, which indicates the discovery type is user equipment-to-network relay discovery, group member discovery or user equipment-to-user equipment relay discovery;
   ProSe relay user equipment ID;
   PLMN ID;
   connectivity information;
   status/maintenance flag; and/or
   group information.

The above contents contained in the discovery packet are only exemplary. Herein, the type listed above is not intended to exhaust all the possibilities, but only used to show the possible contents contained in the discovery packet, for example. That is, the discovery packet includes, but not limited to, the above contents.

In one embodiment of the present invention, when the first D2D user equipment is the remote D2D user equipment, and the second D2D user equipment is the alternative user equipment-to-network relay D2D user equipment, the method further comprises:

the first D2D user equipment selects one second D2D user equipment as its relay user equipment according to the wireless link quality indication.

After obtaining the wireless link quality indication, when the first D2D user equipment is the remote D2D user equipment, and the second D2D user equipment is the alternative user equipment-to-network relay D2D user equipment, the remote D2D UE, which obtains the wireless link quality indication, will select one second D2D UE as its relay UE from the alternative UE-to-Network relay D2D UEs according to the wireless quality indication.

In one embodiment of the present invention, when the first D2D user equipment is the alternative user equipment-to-network relay D2D user equipment, and the second D2D user equipment is the remote D2D user equipment, the first D2D user equipment sends the wireless link quality indication to an eNB it communicates with.

FIG. 3 shows a detail exemplary table showing RLQ, the number of the discovery data packets needed for the soft combined decoding when CRC check is implemented correctly and SINR. As shown in the Figure, a number from 1 to N is used to characterize the RLQ, and the number of the discovery packet needed for the soft combined decoding when the CRC check is implemented correctly can be a random number from 1 to 4. It is appreciated for those skilled in the art that the eNB can also set a number from 1 to 8. Also, the SINR of the received signal can also be 25 dB, 20 dB . . . until −10 dB.

From the table, when the number of the discovery data packets needed for the soft combined decoding when CRC check is implemented correctly is identical, the higher the SINR of the received signal is means the better the sidelink channel quality is, that is, the better the channel quality of PC5 interface is. In this table, it is reflected as the greater the number of RLQ is. Correspondingly, when the SINR of the received signal is unchanged, the less the number of the discovery data packets needed for the soft combined decoding is means the better the sidelink channel quality is, that is, the better the channel quality of PC5 interface is. In this table, it is reflected as the greater the number of RLQ is.

In this invention, it is innovatively proposed that a wireless link quality indication, which indicates sidelink quality between the first D2D UE and the second D2D UE, is generated according to the measurement for the discovery packet received by the first D2D UE. With this method, the radio link quality (RLQ) can be characterized, and not only the compatibility with Release 12 is realized, but also the measurement for the radio link quality is realized with a simple method.

In other words, the present invention innovatively uses the current hardware and represents the quality of the PC5 interface, that is, sidelink channel quality, easily. That is, in the situation where it is compatible with the current Release 12, the generation of the wireless link quality indication, which indicates sidelink quality between the first D2D UE and the second D2D UE, is realized.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:

1. A method of measuring radio link quality in a D2D user equipment in a wireless communication system, wherein the wireless communication system includes an eNB and at least two D2D user equipments, the method comprising:
   a first D2D user equipment receives a discovery packet sent from a second D2D user equipment; and
   the first D2D user equipment measures the radio link quality based on the reception of the discovery packet and generates a wireless link quality indication, which indicates sidelink quality between the first D2D user equipment and the second D2D user equipment;
   wherein the at least two D2D user equipments include an alternative user equipment-to-network relay D2D user equipment and a remote D2D user equipment and wherein the wireless link quality indication is related to a number of the discovery packets needed for successful soft combined decoding; and
   the first D2D user equipment is the remote D2D user equipment, and the second D2D user equipment is the alternative user equipment-to-network relay D2D user equipment; or
   the first D2D user equipment is the alternative user equipment-to-network relay D2D user equipment, and the second D2D user equipment is the remote D2D user equipment.

2. The method according to claim 1, wherein the wireless link quality indication is further related to at least one of the following:

CRC check of the discovery packet;
signal quality of the discovery packet; and
the number of the discovery packets needed for the soft combined decoding to arrive at a successful CRC check.

3. The method according to claim 2, wherein when the wireless link quality indication is related to the CRC check of the discovery packet, the discovery packet includes payload bits and CRC check bits.

4. The method according to claim 2, wherein when the wireless link quality indication is related to the signal quality of the discovery packet, the signal quality of the discovery packet includes strength of a received signal, SNR of a received signal or SINR of a received signal.

5. The method according to claim 4, wherein the better the signal quality of the discovery packet is, the better the sidelink quality between the first D2D user equipment and the second D2D user equipment represented by the wireless link quality indication is.

6. The method according to claim 2, wherein when the wireless link quality indication is related to the number of the discovery packets needed for the soft combined decoding to result in a successful CRC check, the number of the discovery packets needed for the soft combined decoding in a discovery period can be configured as 4 at maximum.

7. The method according to claim 6, wherein the more the number of the discovery packets needed for the soft combined decoding to result in a successful CRC check, the worse the sidelink quality between the first D2D user equipment and the second D2D user equipment represented by the wireless link quality indication is.

8. The method according to claim 2, wherein the wireless link quality indication, which is used to indicate the sidelink quality between the first D2D user equipment and the second D2D user equipment, is indicated by the signal quality combined with the number of the discovery packets needed for the soft combined decoding to result in the successful CRC check.

9. The method according to claim 8, wherein the wireless link quality indication can be scaled linearly or non-linearly.

10. The method according to claim 1, wherein the method further comprises:
the first D2D user equipment requests the second D2D user equipment to send the discovery packet.

11. The method according to claim 1, wherein the discovery packet includes at least one of the following information:
message type, wherein the message type includes announcement type or solicitation/response type;
discovery type, which indicates the discovery type is user equipment-to-network relay discovery, group member discovery or user equipment-to-user equipment relay discovery;
ProSe relay user equipment ID;
PLMN ID;
and/or
group information.

12. The method according to claim 1, wherein when the first D2D user equipment is the remote D2D user equipment, and the second D2D user equipment is the alternative user equipment-to-network relay D2D user equipment, the method further comprises:
the first D2D user equipment selects one second D2D user equipment as its relay user equipment according to the wireless link quality indication.

13. The method according to claim 1, wherein when the first D2D user equipment is the alternative user equipment-to-network relay D2D user equipment, and the second D2D user equipment is the remote D2D user equipment, the first D2D user equipment sends the wireless link quality indication to an eNB it communicates with.

14. A first user equipment, the first user equipment comprising:
at least one processor; and
at least one memory including computer program code, the at least one memory and the computer program code configured to, with the at least one processor, cause the first UE to at least:
receive a discovery packet sent from an associated second user equipment;
measure a radio link quality based on the reception of the discovery packet; and
generate a wireless link quality indication, which indicates sidelink quality between the first user equipment and the second user equipment;
wherein the first and second user equipments include an alternative user equipment-to-network relay user equipment and a remote user equipment and wherein the wireless link quality indication is related to a number of the discovery packets needed for successful soft combined decoding; and
the first user equipment is the remote user equipment, and the second user equipment is the alternative user equipment-to-network relay user equipment; or
the first user equipment is the alternative user equipment-to-network relay user equipment, and the second user equipment is the remote user equipment.

* * * * *